US010705329B2

(12) United States Patent
Gamet et al.

(10) Patent No.: US 10,705,329 B2
(45) Date of Patent: Jul. 7, 2020

(54) ELECTRO-MECHANICAL DESIGNS FOR MEMS SCANNING MIRRORS

(71) Applicant: North Inc., Kitchener (CA)

(72) Inventors: Julien Gamet, Saint Pierre D'Allevard (FR); Alexandre Fotinos, Chavannes-Pres-Renens (CH); Nicholas Abele, Demoret (CH)

(73) Assignee: North Inc., Kitchener (CA)

( * ) Notice: Subject to any disclaimer, the term of this patent is extended or adjusted under 35 U.S.C. 154(b) by 0 days.

(21) Appl. No.: 15/911,489

(22) Filed: Mar. 5, 2018

(65) Prior Publication Data

US 2019/0265463 A1 Aug. 29, 2019

Related U.S. Application Data

(63) Continuation of application No. 14/977,457, filed on Dec. 21, 2015, now Pat. No. 9,910,270.

(60) Provisional application No. 62/240,490, filed on Oct. 12, 2015.

(51) Int. Cl.
*G02B 26/10* (2006.01)
*G02B 26/08* (2006.01)

(52) U.S. Cl.
CPC ......... *G02B 26/105* (2013.01); *G02B 26/085* (2013.01); *G02B 26/101* (2013.01)

(58) Field of Classification Search
None
See application file for complete search history.

(56) References Cited

U.S. PATENT DOCUMENTS

| | | | |
|---|---|---|---|
| 9,910,270 B2* | 3/2018 | Gamet | G02B 26/085 |
| 2004/0135644 A1* | 7/2004 | Mizoguchi | G02B 26/0841 |
| | | | 331/154 |
| 2005/0253055 A1* | 11/2005 | Sprague | G02B 26/085 |
| | | | 250/234 |
| 2008/0007376 A1 | 1/2008 | Jeong et al. | |
| 2009/0027748 A1 | 1/2009 | Sprague et al. | |
| 2014/0016169 A1 | 1/2014 | Abele et al. | |
| 2014/0313557 A1 | 10/2014 | Brown et al. | |
| 2014/0354085 A1 | 12/2014 | Gamet et al. | |

* cited by examiner

*Primary Examiner* — Jennifer D. Carruth
(74) *Attorney, Agent, or Firm* — Thomas Mahon

(57) ABSTRACT

Electro-mechanical designs for MEMS scanning mirrors are described. In various embodiments, a driving coil may be situated on a reflective portion of a MEMS mirror. In some embodiments, a sensing coil may be situated partially or entirely on an outer frame portion of the MEMS mirror. Other embodiments are described and claimed.

16 Claims, 12 Drawing Sheets

*800*

Receive, at a MEMS scanning mirror, light to be reflected to a projection surface, the MEMS scanning mirror comprising a reflective portion and a driving coil disposed at least partially on the reflective portion.
810

Send a control signal to the driving coil for the MEMS scanning mirror, the control signal to cause the MEMS scanning mirror to rotate about at least one axis.
820

```
┌─────────────────────────────────┐
│ Receive a first electric current at a │
│ driving coil of a MEMS scanning mirror, │
│ the first electric current to induce │
│ movement in a reflective portion of the │
│ MEMS scanning mirror. │
│ 910 │
└─────────────────────────────────┘
              │
              │
┌─────────────────────────────────┐
│ Induce a second electric current in a │
│ sensing coil based in part on the induced │
│ movement, the sensing coil disposed │
│ around the driving coil. │
│ 920 │
└─────────────────────────────────┘
```

*FIG. 9*

ELECTRO-MECHANICAL DESIGNS FOR MEMS SCANNING MIRRORS

CROSS-REFERENCE TO RELATED APPLICATION

This application claims the benefit of U.S. patent application Ser. No. 14/977,457 filed Dec. 21, 2015 which claims the benefit of U.S. Provisional Application Ser. No. 62/240,490 filed Oct. 12, 2015, entitled "Electro-Mechanical Design for MEMS Scanning Mirror," which applications are incorporated herein by reference in their entirety.

TECHNICAL FIELD

Embodiments herein generally relate to micro electro-mechanical systems (MEMS) scanning mirrors and MEMS scanning mirror projection systems.

BACKGROUND

MEMS-scanning mirror based laser projection systems are promising candidates for use in ultra-small size and portable applications. In an example MEMS-scanning mirror projection system, a mirror may be arranged to be rotated about two mutually orthogonal axes in order to display pixels of a projected image on a projection surface. In particular, the example MEMS-scanning mirror can reflect light emanating from one or more light sources to project the image. In some MEMS-scanning mirror projection systems, two mirrors may be used, each of which may be arranged to be rotated about one of two mutually orthogonal axes. Laser light sources may be modulated while the MEMS mirror is rotated to effectively pulse and display pixels one after another to generate a projected image. In particular, the MEMS mirror can rotate to scan reflected light over an entirety of the area of the projected image at a high enough speed to achieve an image that appears stable to the human eye. Advantageously, according to such a technique, pixels may only be projected when needed, and thus for parts of the projected image that are black, the laser light source(s) may be turned off, conserving power.

One factor upon which the displayed image quality of a MEMS-based projection system may depend is the precision with which the modulated laser pulses are synchronized with the rotation of the mirror. If synchronization between the modulated laser pulses and the rotation of the mirror is poor, then from one frame to the next, the same pixel may be pulsed according to a slightly different timing, creating blur in the image. In order to precisely synchronize the modulated laser pulses with the rotation of the mirror, it may be necessary to be able to precisely sense the rotational angular position of the mirror. A second factor that may influence the image quality is the extent to which the MEMS mirror remains optically flat during operation. During operation, a MEMS mirror may be subject to forces that may cause it to bend, a phenomenon sometimes called dynamic deformation. Bending or other distortion of the mirror may cause corresponding distortion of the image pixels being generated, which may also constitute a source of perceived blur in the image.

BRIEF DESCRIPTION OF THE DRAWINGS

FIG. 8 illustrates a first example logic flow.
FIG. 9 illustrates a second example logic flow.

DETAILED DESCRIPTION

Various examples may be generally directed to electro-mechanical designs for MEMS scanning mirrors. In various examples, a driving coil may be situated on a reflective portion of a MEMS scanning mirror. In some examples, a sensing coil may be situated partially or entirely on an outer frame portion of the MEMS scanning mirror. Said differently, the driving coil may be disposed inside the sensing coil. In some examples, a multi axis MEMS scanning mirror may be provided with a sensing coil disposed between two driving coils, where each driving coil may be configured to cause the MEMS scanning mirror to rotate in a direction of one of the axis. Other examples are described and claimed.

Figure 1:
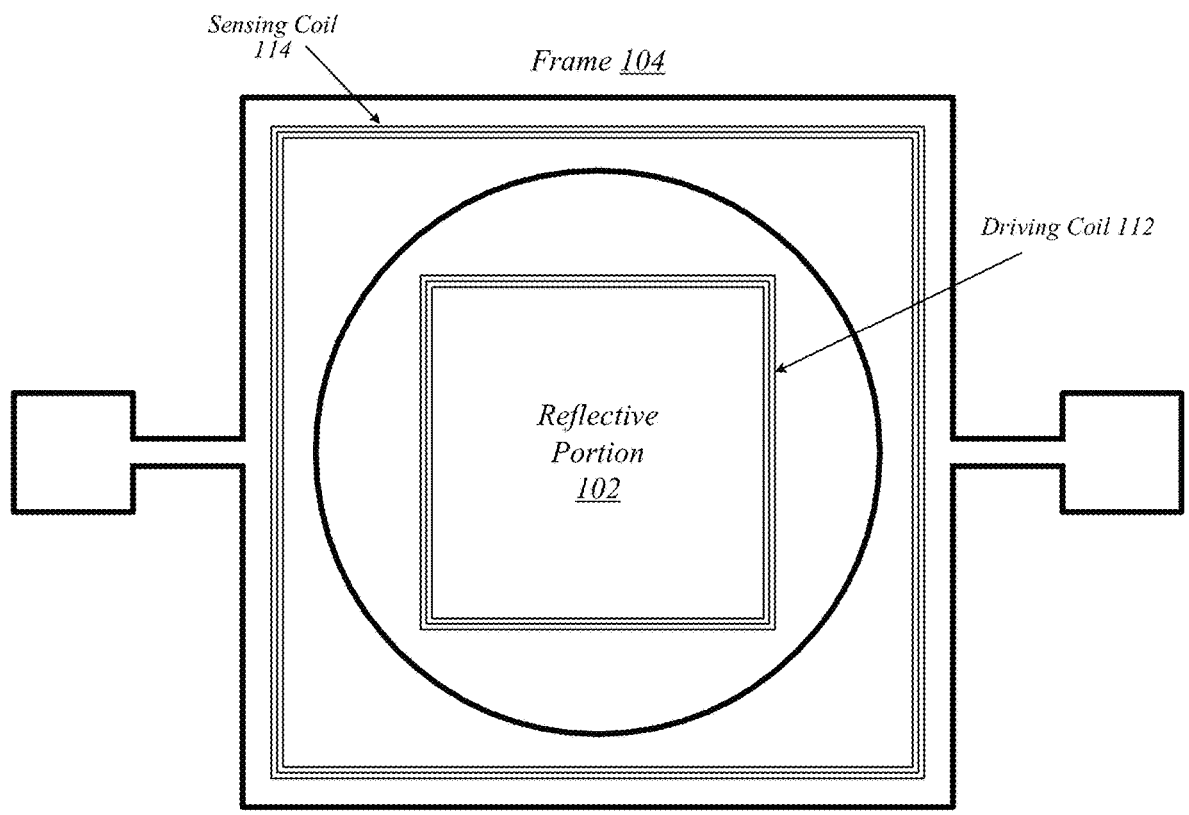
FIG. 1 illustrates a first example MEMS mirror.

FIG. 1 illustrates a block diagram of a MEMS scanning mirror 100, or "MEMS mirror," arranged according to various examples of the present disclosure. The MEMS mirror 100 may be representative of a MEMS mirror that could be implemented in a MEMS scanning mirror projection system. In particular, the MEMS mirror could be implemented to scan light beams across a projection surface while the light beams are modulated and/or pulsed to form pixels to display an image on the projection surface.

As depicted, the MEMS mirror 100 may comprise a reflective portion 102 and a frame 104. In general, the reflective portion 102 and the frame 104 may generally be free-standing moveable parts, with the frame 104 generally connected to a fixed non-movable portion. The reflective portion 102 may generally comprise a portion of MEMS mirror 100, upon which a reflective surface has been affixed, deposited, or otherwise created. Frame 104 may generally comprise a portion of MEMS mirror 100 that surrounds reflective portion 102.

MEMS mirror 100 may comprise a driving coil 112 and a sensing coil 114. In general, the driving coil 112 may be positioned within the sensing coil 114. In some examples, the driving coil 112 can be disposed on the reflective portion 102. More specifically, the driving coil may be disposed into a substrate while the reflective portion is formed over the driving coil (e.g., refer to FIG. 4). In some examples, the sensing coil 114 may be disposed on the frame 104 of the MEMS mirror 100. During operation, electric current can be applied to the driving coil 112 to cause the reflective portion 102 to rotate about a number of axes (e.g., refer to FIG. 2 and FIG. 7). With some examples, the MEMS mirror 100 may be magnetically actuated. For example, the MEMS mirror 100 may be positioned within a magnetic field and electric current may be passed through the driving coil 112 to effect a rotation and/or oscillation of the MEMS mirror 100.

With some examples, situating the driving coil 112 on the reflective portion 102 may not significantly increase and/or impact dynamic deformation of the reflective portion 102 relative to that encountered using a design in which driving coil 112 is situated on the frame 104 and/or around an edge of the reflective portion 102. In some embodiments, situating the driving coil 112 on the reflective portion 102 may enable an increase in the number of individual coils comprised in the driving coil 112 without extra damping. An increase in the number of coils may result in lower power consumption (due to a lower required drive current) and better signal-to-noise ratio (SNR) on the sensing coil 114 signal compared to designs in which driving coil 112 is situated on the frame 104. The embodiments are not limited in this context.

In some examples, the sensing coil 114 is disposed on the frame 104. More specifically, the sensing coil 114 may be disposed on and/or into a substrate around which the reflective portion is formed (e.g., refer to FIG. 4). During operation, as the reflective portion 102 deforms and/or rotates about an axis (e.g., due to application of electric current to the driving coil 112, or the like) the sensing coil 114 may generate an amount of electric current indicative of a position of the reflective portion 102. In some examples, a rotation and/or oscillation of the reflective portion 102 may induce an electric current across the sensing coil 114. The induced electric current may be measured as in induced voltage signal, which can vary as a function of the orientation of the sensing coil 114 with respect to the driving coil 112—and thus the reflective portion 102. The induced current in the sensing coil can be used to determine an angular rotation—and thus a position of the reflective portion 102.

In some examples, situating the sensing coil 114 on the frame 104 (e.g., as opposed to on the reflective portion 102, or the like) may reduce sensitivity of the position sensing of the reflective portion 102 to temperature variation. For example, as light (e.g., refer to FIG. 2 and FIG. 7) is incident on the reflective portion 102, the temperature of the reflective portion 102 can be increased. The position of the sensing coil 114 on the frame 104 may reduce a sensitivity to this temperature fluctuation. More specifically, in some examples, the reflective portion 102 may only reflect a part of the light incident on the reflective portion 102 while the rest of the incident light may be absorbed by the reflective portion 102. For example, the reflective portion 102 of the MEMS mirror 100 may reflect between 85% and 95% of incident light while 15% to 5% of the incident light may be absorbed. The energy of the absorbed light may be converted to heat, which may spread out from the mirror center towards the edges, potentially modifying sensing coil resistance and causing thermal noise that reduces the SNR of the induced-voltage signal. Introducing physical separation between the sensing coil 114 and the reflective portion 102 may reduce the extent of heat exchange from reflective portion 102 to sensing coil 114, thereby reducing thermal noise, increasing SNR of the induced-voltage signal, and enabling more precise position sensing. The embodiments are not limited in this context.

It is worthy of note, in some examples, rather than being situated entirely on frame 104 around the edge of the MEMS mirror 100, some or all of the sensing coil 114 could be situated on the reflective portion 102. In various examples, situating driving coil 112 and sensing coil 114 on the reflective portion 102 may enable an increase in the number of individual coils comprised in driving coil 112 and/or sensing coil 114 without extra damping, which may result in lower power consumption and/or better SNR.

In some examples, placing driving coil 112 and/or sensing coil 114 on the movable reflective portion 102 may significantly limit the induced stress in the metallic coils. Such stresses may result in mechanical failures if they exceed the yield strength of the metallic material used to form the coils. Furthermore, placing sensing coil 114 on a limited deformation movable area, such as the reflective portion 102, may decrease the distortion of the induced voltage and thus improve the SNR of the induced voltage signal.

Figure 2:
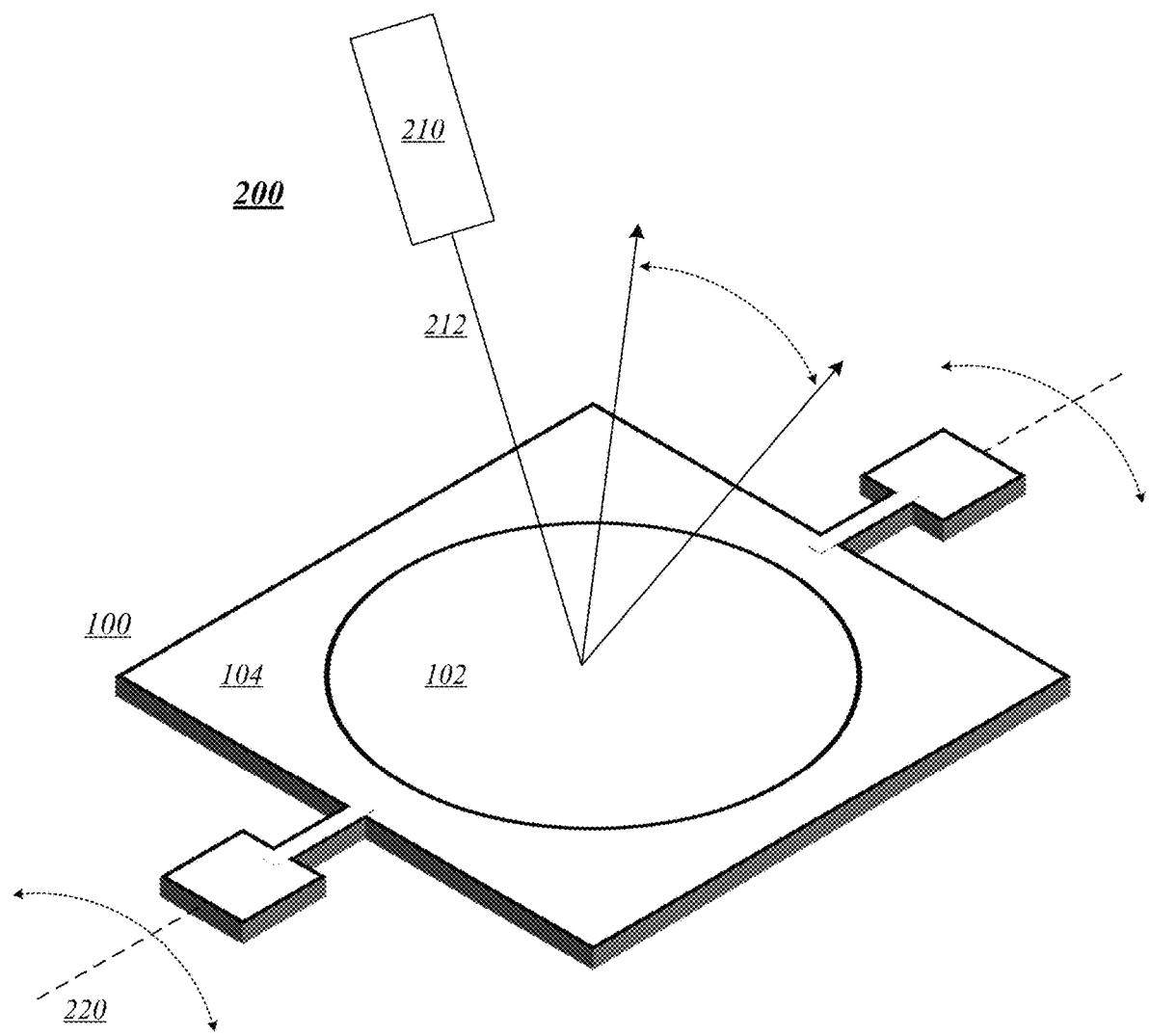
FIG. 2 illustrates a first example MEMS scanning mirror projection system.

FIG. 2 illustrates a block diagram of a MEMS scanning mirror projection system 200, arranged according to various examples of the present disclosure. In general, the MEMS scanning mirror projection system 200 includes a MEMS mirror, such as, for example, the MEMS mirror 100 of FIG. 1 and a light source 210. In some examples, the light source 210 can include any of a variety of light sources, such as, for example, laser light sources, light emitting diode (LED) light sources, or the like. During operation, the light source 210 may emit a light beam 212. Additionally, the light source 210 may modulate and/or pulse the light beam 212 to correspond to a particular pixel of an image.

In general, the light source 210 and the MEMS mirror 100 are arranged in optical communication with each other. In particular, the light source 210 may emit the light beam 212 and the MEMS mirror 100 may receive the light beam 212. The MEMS mirror 100 may reflect the light beam 212 from the reflective portion 102. During operation, the MEMS mirror 100 may be rotated about a number of axes, for example, the axis 220. In particular, the MEMS mirror 100 may be rotated about the axis 220 to scan the received light beam 212 across a projection surface (not shown). Said differently, the MEMS mirror 100 can be rotated about the axis 220 in order to modify a direction in which the light beam laser 212 incident on the reflective portion 102 is reflected.

It is noted, that the MEMS scanning mirror projection system 200 may be implemented to scan the light beam 212 across multiple axis (e.g., 2D projection systems, or the like). For example, the MEMS scanning mirror projection system 200 could be implemented with a 2D MEMS mirror (e.g., refer to FIGS. 5-7). Examples are not limited in this context.

Figure 3:
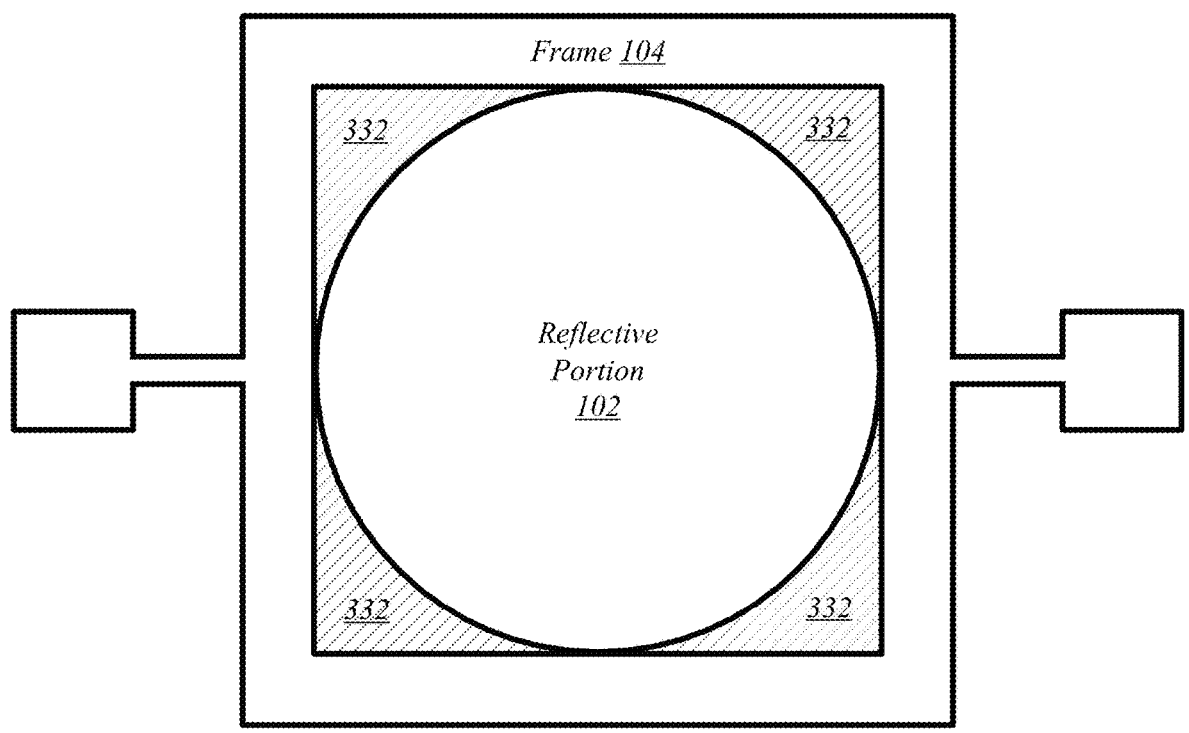
FIG. 3 illustrates a second example MEMS mirror.

FIG. 3 illustrates a block diagram of a MEMS mirror 300, arranged according to various examples of the present disclosure. The MEMS mirror 300 may be representative of a MEMS mirror that could be implemented in a MEMS scanning mirror projection system (e.g., the system 200, or the like). In particular, the MEMS mirror could be implemented to scan light beams across a projection surface while the light beams are modulated and/or pulsed to form pixels to display an image on the projection surface.

As depicted, the MEMS mirror 300 may comprise the reflective portion 102 and the frame 104. Additionally, although not shown, the MEMS mirror 300 may, like the MEMS mirror 100, include a driving coil disposed within a sensing coil. For example, the driving coil 112 disposed within the sensing coil 114.

In some examples, the MEMS mirror 300 may include silicon etched-away portions 332, which may be created around the reflective portion 102 to minimize dynamic deformation of the reflective portion 102. In particular, the etched-away portions 332 may minimize and/or reduce a dynamic deformation occurring during rotation (e.g., about the axis 220, or the like) of the reflective surface 102. In some examples, such dynamic deformation may largely be due to restoring force that results from an application of a torsion beam during mirror rotation. Examples are not limited in this context.

Figure 4:
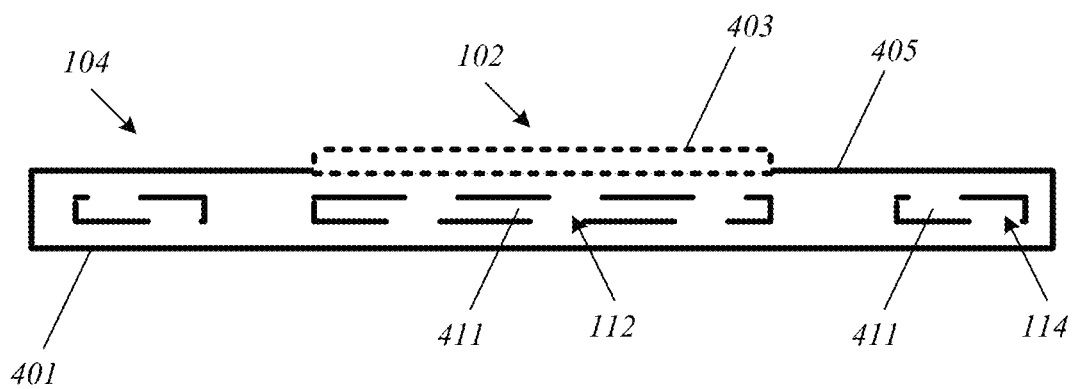
FIG. 4 illustrates a third example MEMS mirror.

FIG. 4 illustrates a cut-away view of a MEMS mirror 400, arranged according to various examples of the present disclosure. The MEMS mirror 400 may be representative of a MEMS mirror that could be implemented in a MEMS scanning mirror projection system (e.g., the system 200, or the like). In particular, the MEMS mirror could be implemented to scan light beams across a projection surface while the light beams are modulated and/or pulsed to form pixels to display an image on the projection surface.

As depicted, the MEMS mirror 400 may comprise a substrate 401 including reflective portion 102 and frame portion 104. In some examples, the substrate 401 may be a silicon based substrate. The MEMS mirror 400 may be manufactured by embedding and/or depositing conductive traces 411 into and/or onto the substrate 401. For example, conductive traces 411 can be formed via an optical lithographic process. In some examples, conductive traces 411 can be formed from a metallic material, such as, for example, gold, silver, copper, or the like. The conductive traces 411 can be positioned to from the driving coil 112 and the sensing coil 114.

More specifically, the conductive traces 411 can be formed in areas of the substrate corresponding to the frame 104 and the reflective surface 102, to form the sensing coils 114 and the driving coils 102 positioned as described herein. Additionally, as depicted, in some examples, the driving coil 112 and the sensing coil 114 can be embedded into the substrate 401. Subsequently, a reflective coating 403 can be disposed and/or deposited onto surface 405 of the substrate 401 to form the reflective surface 102.

Figure 5:
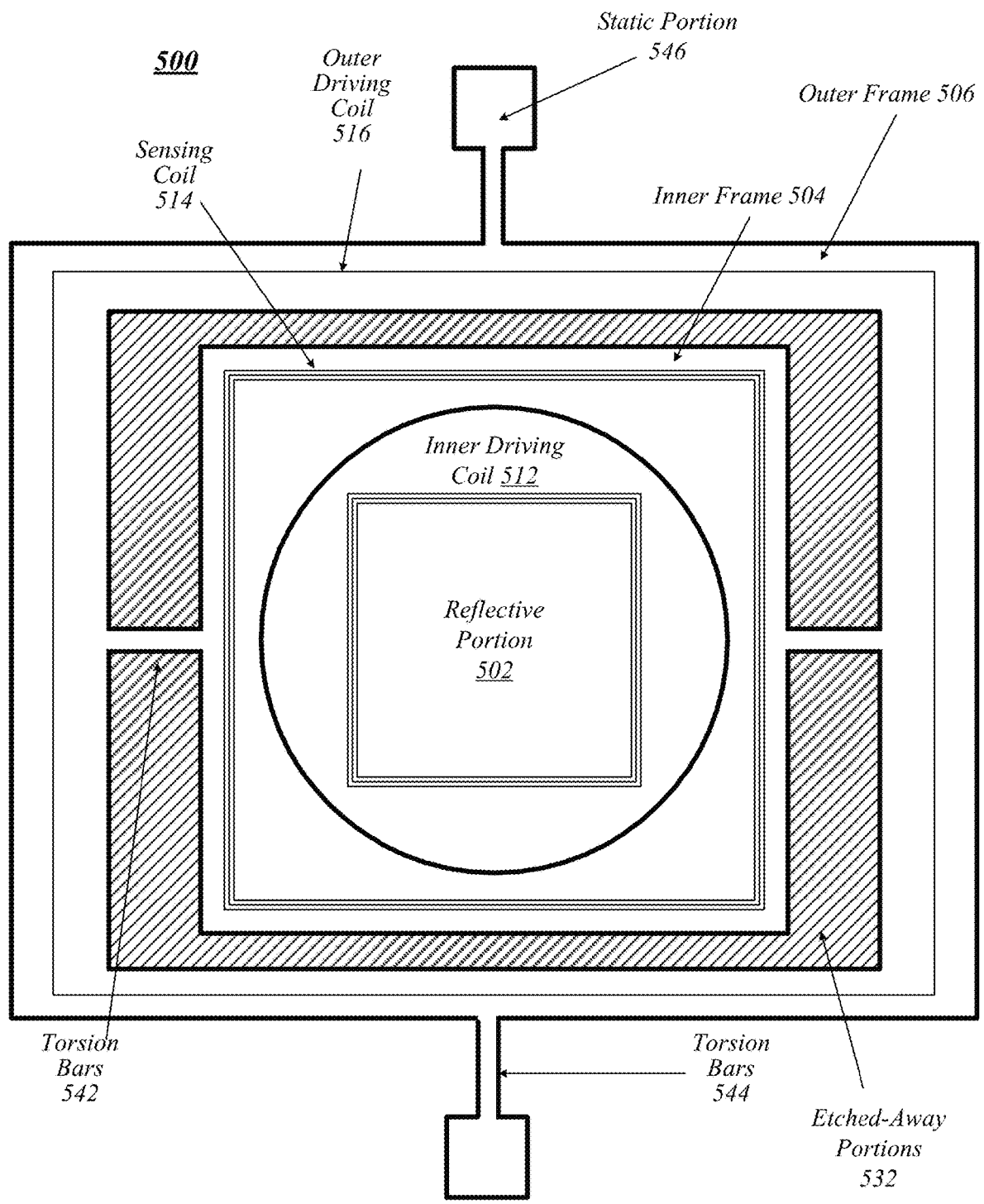
FIG. 5 illustrates a fourth example MEMS mirror.

FIG. 5 illustrates a block diagram of a MEMS scanning mirror 500, or "MEMS mirror," arranged according to various examples of the present disclosure. The MEMS mirror 500 may be representative of a MEMS mirror that could be implemented in a MEMS scanning mirror projection system (e.g., the system 200 of FIG. 2, or the like). In particular, the MEMS mirror 500 could be implemented to scan light beams across a projection surface while the light beams are modulated and/or pulsed to form pixels to display an image on the projection surface.

As depicted, the MEMS mirror 500 may comprise the reflective portion 502, inner frame 504, and outer frame 506. In general, the reflective portion 502 may generally comprise a free-standing moveable MEMS mirror. In some examples, the reflective portion 502 may be implemented similar to the reflective portion 102 described in conjunction with FIGS. 1-4. For example, the reflective portion 502 may comprise a portion of MEMS mirror 500, upon which a reflective surface has been affixed, deposited, or otherwise created. Inner frame 504 may generally comprise a portion of MEMS mirror 500 that surrounds reflective portion 502. In some examples, reflective portion 502 may be mechanically coupled to inner frame 504 via torsion bars 542. In some examples, the MEMS mirror 500 may include silicon etched-away portions 532, which may be created around the reflective portion 502 to minimize dynamic deformation of the reflective portion 502. Outer frame 506 of MEMS mirror 500 may surround inner frame 504 and may be mechanically coupled to inner frame 504 via torsion bars 542. Outer frame 506 of MEMS mirror 500 may be mechanically coupled to the static portion 546 via torsion bars 544.

The MEMS mirror 500 may comprise an inner driving coil 512, an outer driving coil 516, and a sensing coil 514. In general, the sensing coil 514 may be positioned between the driving coils 512 and 516. In particular, the sensing coil 514 may be positioned on the inner frame 504. The inner driving 512 may be positioned on the reflective portion 502 while the outer driving coil 516 may be positioned on the outer frame 506.

During operation, electric current can be applied to the driving coils 512 and 516 to cause the reflective portion 502 to rotate about multiple axes. In some examples, electric current can be selectively applied to either of the driving coils 512 and/or 516 to adjust a speed of rotation for either of the axes. With some examples, the MEMS mirror 500 may be magnetically actuated. For example, the MEMS mirror 500 may be positioned within a magnetic field and electric current may be passed through the driving coils 512 and/or 516 to effect a rotation and/or oscillation of the MEMS mirror 500.

Figure 6:
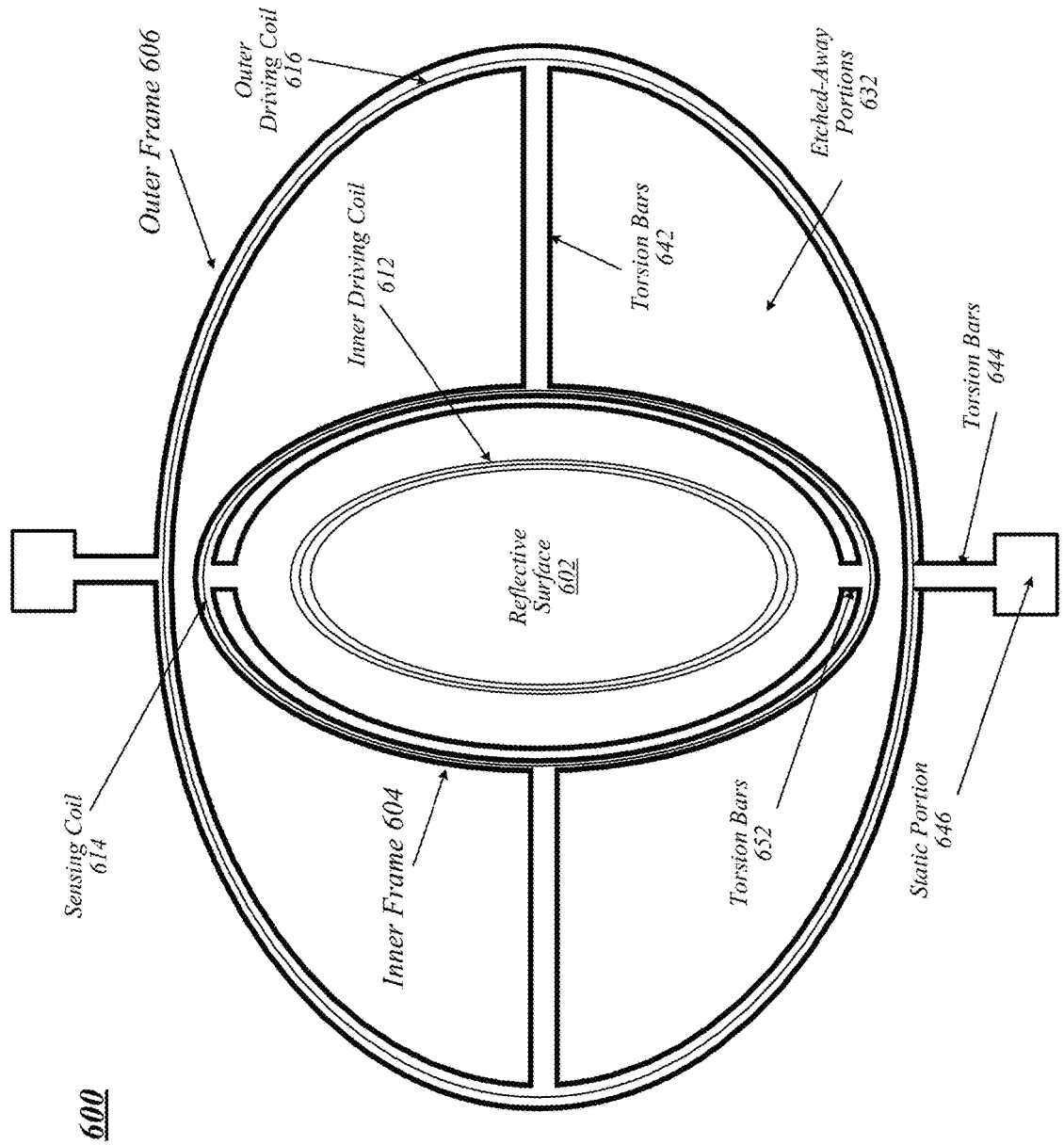
FIG. 6 illustrates a fifth example MEMS mirror.

FIG. 6 illustrates a block diagram of a MEMS scanning mirror 600, or "MEMS mirror," arranged according to various examples of the present disclosure. The MEMS mirror 600 may be representative of a MEMS mirror that could be implemented in a MEMS scanning mirror projection system (e.g., the system 200, of FIG. 2, or the like). In particular, the MEMS mirror could be implemented to scan light beams across a projection surface while the light beams are modulated and/or pulsed to form pixels to display an image on the projection surface. It is noted, the MEMS mirror 600 is similar to the MEMS mirror 500, except that the shape of the MEMS mirror 600 is oval, as opposed to a square or rectangular shape of the MEMS mirror 500. However, it is noted, example MEMS mirrors of the present disclosure can take any of a variety of geometric shapes, such as, for example, squares, rectangles, circles, ovals, polygons, or the like.

As depicted, the MEMS mirror 600 may comprise the reflective portion 602, inner frame 604, and outer frame 606. In general, reflective portion 602 may generally comprise a portion of MEMS mirror 600, upon which a reflective surface has been affixed, deposited, or otherwise created. Inner frame 604 may generally comprise a portion of MEMS mirror 600 that surrounds reflective portion 602. In some examples, reflective portion 602 may be mechanically coupled to inner frame 604 via torsion bars 652. In some examples, the MEMS mirror 600 may include silicon etched-away portions 632, which may be created around the reflective portion 602 to minimize dynamic deformation of the reflective portion 602. Outer frame 606 of MEMS mirror 600 may surround inner frame 604 and may be mechanically coupled to inner frame via torsion bars 642. Outer frame 606 of MEMS mirror 600 may be mechanically coupled to the static portion 646 via torsion bars 644

The MEMS mirror 600 may comprise the inner driving coil 612, the outer driving coil 616, and the sensing coil 614. In general, the sensing coil 614 may be positioned between the driving coils 612 and 616. In particular, the sensing coil 614 may be positioned on the inner frame 604. The inner driving coil 612 may be positioned on the reflective portion 602 while the outer driving coil is positioned on the outer frame 606.

During operation, electric current can be applied to the driving coils 612 and 616 to cause the reflective portion 602 to rotate about multiple axes. In some examples, electric current can be selectively applied to either of the driving coils 612 and/or 616 to adjust a speed of rotation for either of the axes. With some examples, the MEMS mirror 600 may be magnetically actuated. For example, the MEMS mirror 600 may be positioned within a magnetic field and electric current may be passed through the driving coils 612 and/or 616 to effect a rotation and/or oscillation of the MEMS mirror 600.

In some examples, the inner driving coil 612 can comprise between 5 and 120 coils, where each of the coils are spaced between 2 to 15 microns apart. In some examples, the sensing coil 614 can comprise between 5 and 15 coils, where each of the coils is spaced between 2 to 15 microns apart. In some examples, the outer driving coil can comprise between 5 to 60 coils, where each of the coils are spaced between 2 to 15 microns apart.

Figure 7:
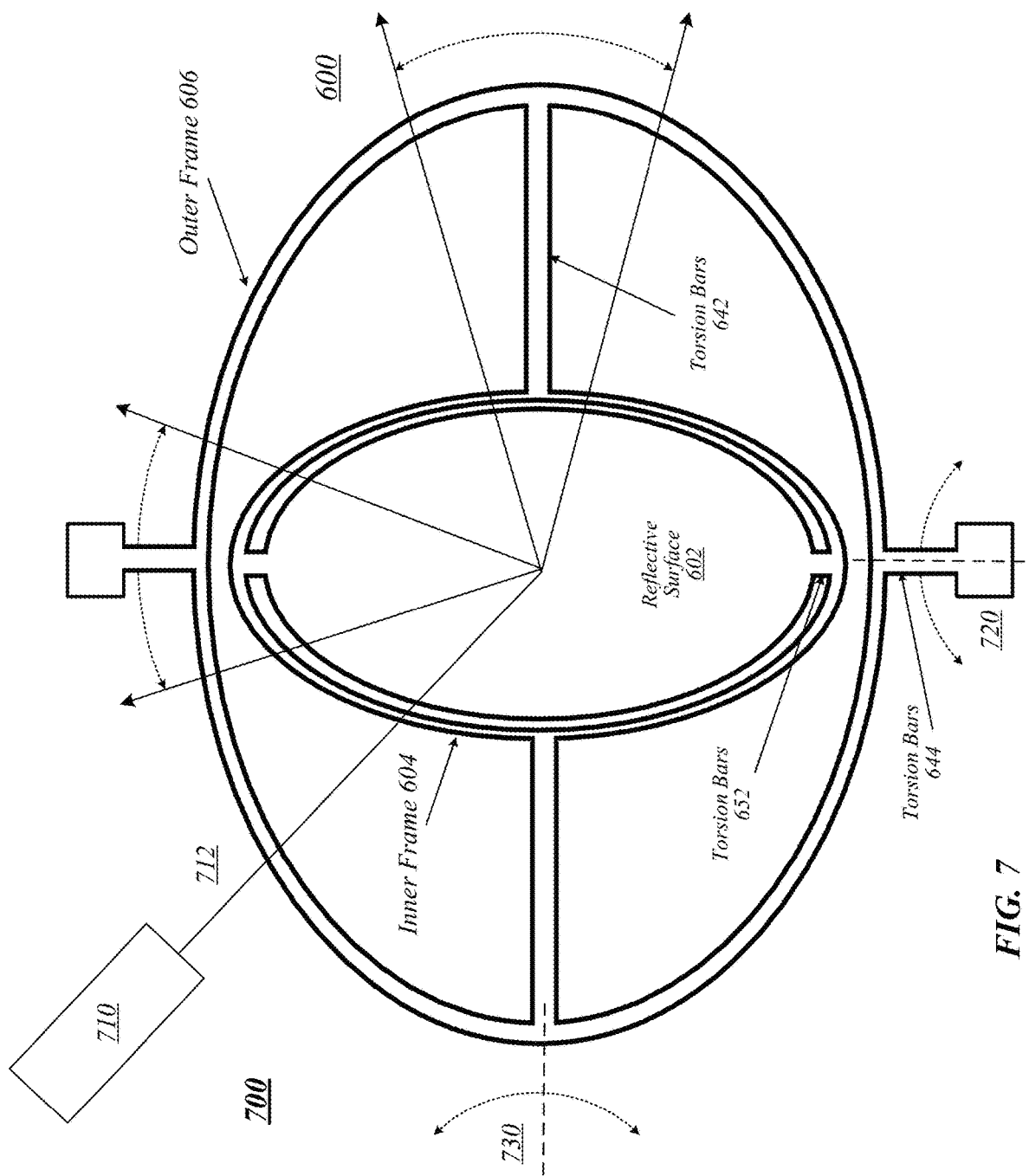
FIG. 7 illustrates a second example MEMS scanning mirror projection system.

FIG. 7 illustrates a block diagram of a MEMS scanning mirror projection system 700, arranged according to various examples of the present disclosure. In general, the MEMS scanning mirror projection system 700 includes a MEMS mirror, such as, for example, the MEMS mirror 600 of FIG. 6 and a light source 710. In some examples, the light source 710 can include any of a variety of light sources, such as, for example, laser light sources, light emitting diode (LED) light sources, or the like. During operation, the light source 710 may emit a light beam 712. Additionally, the light source 710 may modulate and/or pulse the light beam 712 to correspond to a particular pixel of an image.

In general, the light source 710 and the MEMS mirror 600 are arranged in optical communication with each other. In particular, the light source 710 may emit the light beam 712 and the MEMS mirror 600 may receive the light beam 712. The MEMS mirror 600 may reflect the light beam 712 from the reflective portion 602. During operation, the MEMS mirror 600 may be rotated about a number of axes, for example, the axis 720 and the axis 730. In particular, the MEMS mirror 600 may be rotated about the axis 720 to scan the received light beam 712 across a projection surface (not shown) in a first direction. Additionally, the MEMS mirror 600 may be rotated about the axis 730 to scan the received light beam 712 across the projection surface in a second direction. Said differently, the MEMS mirror 600 can be rotated about the axes 720 and/or 730 to modify a direction in which the light beam laser 712 incident on the reflective portion 602 is reflected.

FIG. 8 illustrates a logic flow 800, arranged according to various examples of the present disclosure. The logic flow 800 may begin at block 810. At block 810 "receive, at a MEMS scanning mirror, light to be reflected to a projection surface, the MEMS scanning mirror comprising a reflective portion and a driving coil disposed at least partially on the reflective portion" the MEMS scanning mirror (e.g., the MEMS mirror 100, the MEMS mirror 300, the MEMS mirror 400, the MEMS mirror 500, the MEMS mirror 600, or the like) may receive light (e.g., light 212, light 712, or the like) to be reflected by a reflective portion of the MEMS scanning mirror. As a specific example, the MEMS mirror 600 may receive light 712 at the reflective portion 602. As depicted, for example, in FIG. 6, the MEMS scanning mirror 600 includes driving coil 612 disposed proximate to reflective portion 602.

Continuing to block 820 "receive a voltage control signal at the driving coil for the MEMS scanning mirror, the voltage control signal to cause the MEMS scanning mirror to rotate about at least one axis" the driving coil (e.g., the driving coil 112, the driving coil 512, the driving coil 612, or the like) may receive a voltage control signal to cause the MEMS scanning mirror, and particularly, the reflective portion, to rotate about at least one axis. For example, an applied voltage or electric current to the driving coil 612 of the MEMS mirror 600 may cause the reflective portion 602 to rotate about the axis 720. As another example, an applied voltage or electric current to the outer driving coil 616 of the MEMS mirror 600 may cause the reflective portion 602 to rotate about the axis 730.

FIG. 9 illustrates a logic flow 900, arranged according to various examples of the present disclosure. The logic flow 900 may begin at block 910. At block 910 "receiving a first electric current at a driving coil of a MEMS mirror" the MEMS mirror (e.g., the MEMS mirror 100, the MEMS mirror 300, the MEMS mirror 400, the MEMS mirror 500, the MEMS mirror 600, or the like) may receive a first electric current at a driving coil (e.g., the driving coil 112, the driving coil 512, the driving coil 612, or the like). In particular, during operation, an applied electric current may activate the driving coil to cause rotation of the reflective surface (e.g., 102, 502, 602, or the like) of the MEMS mirror about an axis. In some examples, at block 910, multiple electric currents may be received at multiple driving coils, respectively. For example, a first applied electric current may activate the driving coil 612 to cause the reflective surface to rotate about the axis 730 while a second applied electric current may activate the driving coil 616 to cause the reflective surface to also rotate about the axis 720.

Continuing to block 920 "induce a second electric current in a sensing coil based in part on the induced movement, the sensing coil disposed around the driving coil" movement of the reflective portion may induce a second electric current in the sensing coil (e.g., the sensing coil 114, 514, 614, or the like) where the induced second electric current is based at least in part on a position of the reflective portion about the axis (e.g., the axis 220, the axis 720, the axis 730, or the like).

Figure 10:
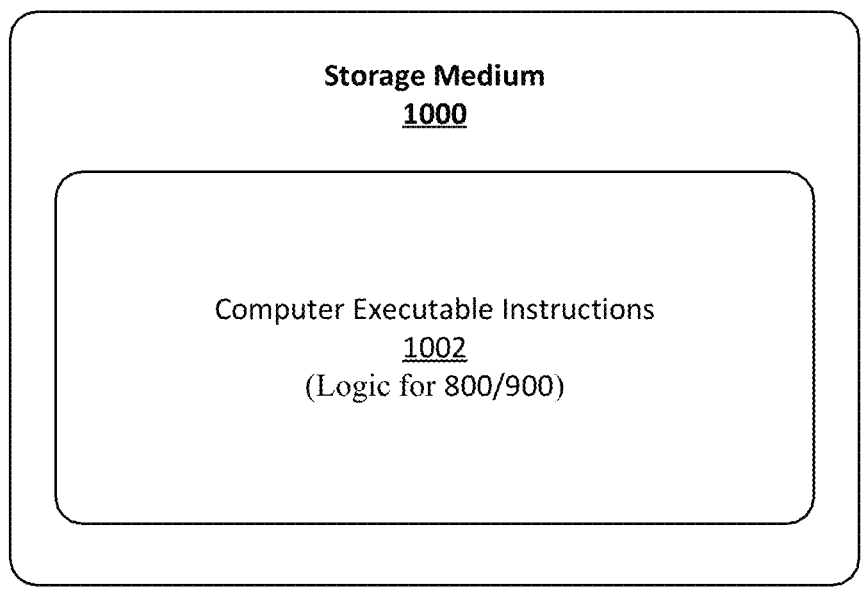
FIG. 10 illustrates an example computer readable medium.

FIG. 10 illustrates an embodiment of a storage medium 1000. The storage medium 1000 may comprise an article of manufacture. In some examples, the storage medium 1000 may include any non-transitory computer readable medium or machine readable medium, such as an optical, magnetic or semiconductor storage. The storage medium 1000 may store various types of computer executable instructions e.g., 1002). For example, the storage medium 1000 may store various types of computer executable instructions to implement technique 800. In some examples, the storage medium 1000 may store various types of computer executable instructions to implement technique 900.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
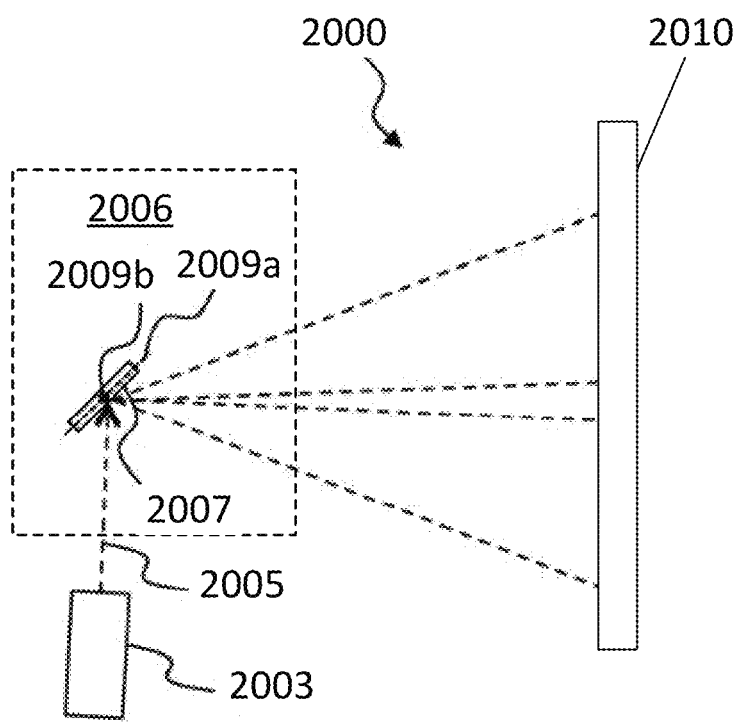
FIG. 11 illustrates a first example system.

FIG. 11 is a block diagram illustrating an example optical system 2000. In general, the optical system 2000 may be implemented in any of a variety of projection systems. In some examples, the system 2000 may be implemented in a heads up display (HUD) system. Such a HUD system may be implemented in, for example, cars, airplanes, trains, boats, glasses, head worn devices, or the like. It is noted, that the optical system 2000 may be referenced as a light projection system. However, examples are not limited in these contexts.

The system 2000 can include a light source 2003. In some examples, the light source 2003 may be a laser light source, which emits a light beam 2005. With some examples, the light beam 2005 may have a linear polarization. With some examples, the light source 2003 may emit multiple light beams that are combined (e.g., at a beam combiner, or the like) into a single light beam.

The system 2000 additionally includes a scanning mirror system 2006. The light source 803 and the scanning mirror system 806 are arranged such that the scanning mirror system 2006 can receive light emitted by the light source 2003. With some examples, the scanning mirror system 2006 may be a Micro-Electro-Mechanical System (MEMS) scanning mirror. Such a MEMS system, for example, can include a movable plate comprising a mirror 2007, which is arranged to be rotated about two mutually orthogonal axes. For example, this figure illustrates the system 2007 comprising the mirror 2007 arranged to rotate about the axis 2009*a* and 2009*b*. With some examples, the mirror 2007 may rotate about a single axis only. As another example, the system 2000 may include multiple mirrors, for example two mirrors arranged to rotate about mutually orthogonal axis. Examples are not limited in this context.

With some examples, the MEMS scanning mirror may be magnetically actuated. With some examples, the MEMS scanning mirror may be electrically actuated, such as, for example, via a piezoelectric actuator, or the like. With some examples, the MEMS scanning mirror 2007 may be implemented as the MEMS scanning mirror systems described here (e.g., 100, 300, 400, 500, and/or 600).

In general, the scanning mirror system 2006 can scan the light beam 2005 over a projection surface 2010 to project an image onto the surface. In some examples, the image is projected and/or displayed on the surface. With some examples, the light incident on the surface is reflected and diffracted from the surface. For example, the light may be reflected to one or more exit pupils for projection of a perceived image at a user's eye.

Figure 12:
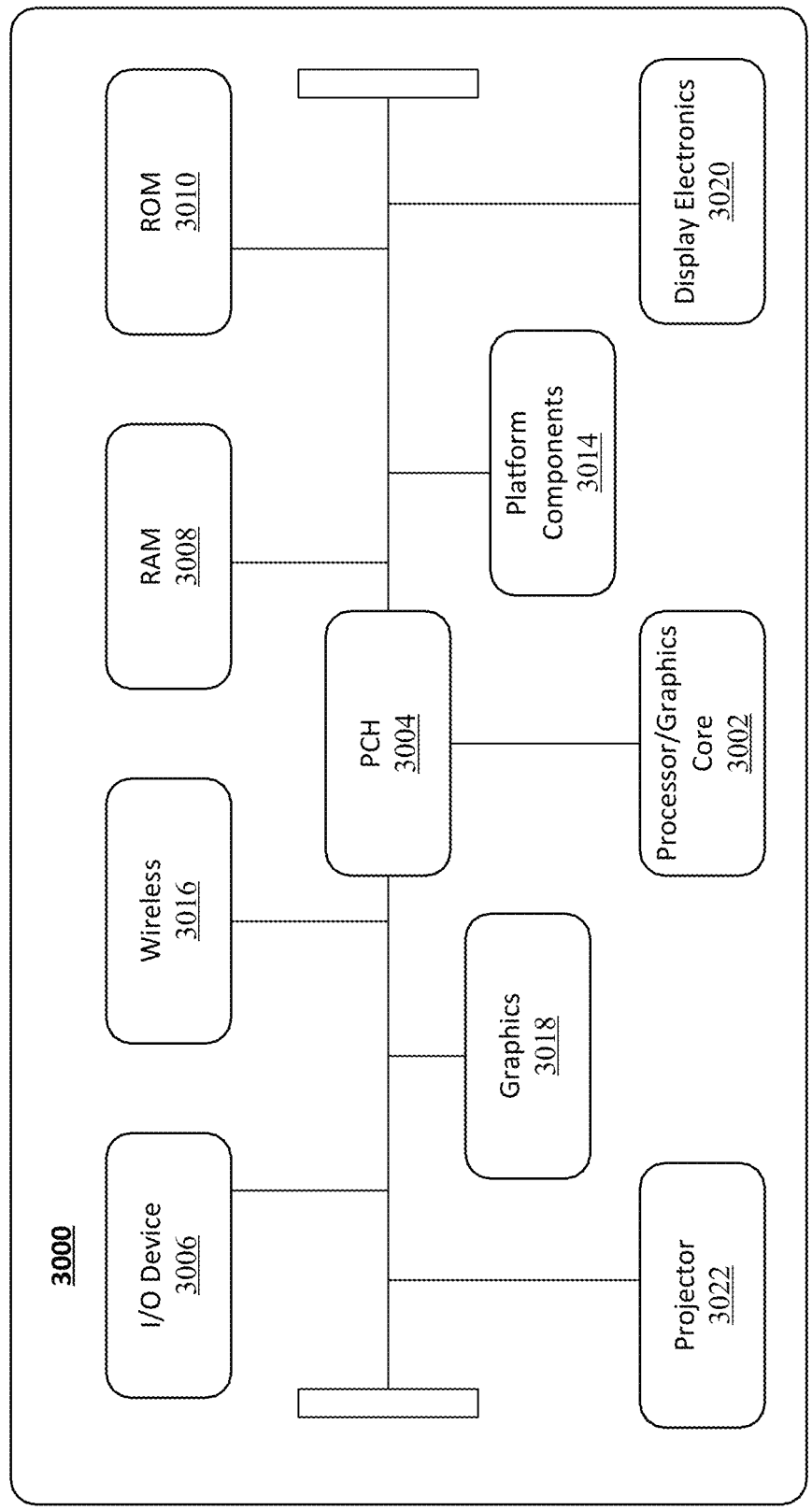
FIG. 12 illustrates a second example system.

FIG. 12 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020, projector 3022 (e.g., including the MEMS mirrors 100, 200, 300, 400, 500, 800, or the like, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The disclosure now turns to providing example implementations. These examples are given for clarity of presentation and not to be limiting.

Example 1

An apparatus, comprising: a reflective portion; a frame disposed at least partially around the reflective portion; a driving coil to receive a first electric current to induce movement of the reflective portion about a first axis in response to the received electric current; and a sensing coil disposed at least partially around the driving coil, the induced movement to induce a second electric current in the sensing coil, the second electric current to indicate a position of the reflective portion about the first axis.

Example 2

The apparatus of example 1, the apparatus a microelectromechanical system (MEMS) mirror, the reflective portion to receive a light beam from a light source, the induced movement to scan the light beam across a projection surface to project an image.

Example 3

The apparatus of example 1, the driving coil disposed proximate to the reflective portion.

Example 4

The apparatus of example 3, comprising a substrate, the reflective portion disposed on the substrate and the driving coil embedded into the substrate under the reflective portion.

Example 5

The apparatus of example 4, comprising: an outer frame disposed at least partially around the frame; and an outer driving coil disposed at least partially around the sensing coil, the outer driving coil to receive a third electric current to induce second movement of the reflective portion about a second axis in response to the received electric current.

Example 6

The apparatus of example 5, comprising torsion bars to mechanically couple the frame to the outer frame, the torsion bars to provide the induced movement about the first axis.

Example 7

The apparatus of example 6, the second electric current to indicate at least one of the position of the reflective portion about the first axis or the second axis.

Example 8

The apparatus of example 7, comprising: a static portion; and outer torsion bars to mechanically couple the outer frame to the static portion, the outer torsion bars to provide the induced second movement about the second axis.

Example 9

The apparatus of any one of examples 6 to 8, the outer driving coil comprising between 5 to 60 individual coils, wherein each individual coil is spaced between 2 to 15 microns apart.

Example 10

The apparatus of any one of examples 1 to 8, the driving coil comprising between 5 to 60 individual coils, wherein each individual coil is spaced between 2 to 15 microns apart.

Example 11

The apparatus of any one of examples 1 to 8, the sensing coil comprising between 5 to 15 individual coils, wherein each individual coil is spaced between 2 to 15 microns apart.

Example 12

The apparatus of any one of examples 1 to 8, wherein a perimeter of at least one of the reflective portion or the frame comprises a square, a rectangle, an oval, a circle, or a polygon.

Example 13

A system comprising: a light source to emit a light beam; and a microelectromechanical system (MEMS) mirror, the MEMS mirror comprising: a reflective portion to receive the light beam; a frame disposed at least partially around the reflective portion; a driving coil to receive a first electric current to induce movement of the reflective portion about a first axis in response to the received electric current to project the light beam onto a projection surface; and a sensing coil disposed at least partially around the driving coil, the induced movement to induce a second electric current in the sensing coil, the second electric current to indicate a position of the reflective portion about the first axis.

Example 14

The system of example 13, the driving coil disposed proximate to the reflective portion.

Example 15

The system of example 14, the MEMS mirror comprising a substrate, the reflective portion disposed on the substrate and the driving coil embedded into the substrate under the reflective portion.

Example 16

The system of example 15, the MEMS mirror comprising: an outer frame disposed at least partially around the frame; and an outer driving coil disposed at least partially around the sensing coil, the outer driving coil to receive a third electric current to induce second movement of the reflective portion about a second axis in response to the received electric current.

Example 17

The system of example 16, the MEMS mirror comprising torsion bars to mechanically couple the frame to the outer frame, the torsion bars to provide the induced movement about the first axis.

Example 18

The system of example 17, the second electric current to indicate at least one of the position of the reflective portion about the first axis or the second axis.

Example 19

The system of example 18, the MEMS mirror comprising: a static portion; and outer torsion bars to mechanically couple the outer frame to the static portion, the outer torsion bars to provide the induced second movement about the second axis.

Example 20

The system of any one of examples 17 to 19, the outer driving coil comprising between 5 to 60 individual coils, wherein each individual coil is spaced between 2 to 15 microns apart.

Example 21

The system of any one of examples 17 to 19, the driving coil comprising between 5 to 60 individual coils, wherein each individual coil is spaced between 2 to 15 microns apart.

Example 22

The system of any one of examples 17 to 19, the sensing coil comprising between 5 to 15 individual coils, wherein each individual coil is spaced between 2 to 15 microns apart.

Example 23

The system of any one of examples 13 to 19, wherein a perimeter of at least one of the reflective portion or the frame comprises a square, a rectangle, an oval, a circle, or a polygon.

Example 24

A method comprising: receiving a first electric current at a driving coil of a microelectromechanical system (MEMS) mirror, the first electric current to induce movement in a reflective portion of the MEMS mirror; inducing a second electric current in a sensing coil of the MEMS mirror, the sensing coil disposed at least partially around the driving coil.

Example 25

The method of example 24, comprising rotating a reflective portion of the MEMS mirror about a first axis in response to the first electric current, the second electric current indicative of a position of the reflective portion about the first axis.

Example 26

The method of example 25, comprising receiving a third electric current at an outer driving coil of the MEMS mirror, the outer driving coil disposed at least partially around the sensing coil.

Example 27

The method of example 26, comprising rotating the reflective portion of the MEMS mirror about a second axis in response to the third electric current, the second electric current indicative of at least one of the position of the reflective portion about the first axis or the position of the reflective portion about the second axis.

Example 28

The method of example 27, wherein the MEMS mirror comprises a frame disposed at least partially around the reflective portion and wherein the sensing coil is disposed on the frame.

Example 29

The method of example 28, wherein the MEMS mirror comprises torsion bars to mechanically couple the reflective portion to the frame.

Example 30

The method of example 29, wherein the MEMS mirror comprises an outer frame disposed at least partially around the frame and wherein the outer driving coil is disposed on the outer frame.

Example 31

The method of example 30, wherein the MEMS mirror comprises outer torsion bars to mechanically couple the frame to the outer frame.

Example 32

The method of any one of examples 24 to 31, wherein the outer driving coil comprises between 5 to 120 individual coils, wherein each individual coil is spaced between 2 to 15 microns apart.

Example 33

The method of any one of examples 24 to 31, the driving coil comprises between 5 to 60 individual coils, wherein each individual coil is spaced between 2 to 15 microns apart.

Example 34

The method of any one of examples 24 to 31, wherein the sensing coil comprises between 5 to 15 individual coils, wherein each individual coil is spaced between 2 to 15 microns apart.

Example 35

The method of any one of examples 24 to 31, wherein a perimeter of at least one of the reflective portion or the frame comprises a square, a rectangle, an oval, a circle, or a polygon.

Example 36

The method of any one of examples 24 to 31, comprising: receiving a light beam from a light source; and reflecting the light beam from the reflective surface to project an image onto a projection surface.

Example 37

A method comprising: receiving, at a reflective portion of a microelectromechanical system (MEMS) mirror, light to be reflected to a projection surface; receiving, at a driving coil of the MEMS mirror, a first electric current to induce movement of the reflective portion of the MEMS mirror, the driving coil disposed proximate to the reflective portion.

Example 38

The method of example 37, comprising inducing, based at least partially on the induced movement, a second electric current in a sensing coil of the MEMS mirror, the sensing coil disposed at least partially around the driving coil.

Example 39

The method of example 38, comprising rotating the reflective portion of the MEMS mirror about a first axis in response to the first electric current, the second electric current indicative of a position of the reflective portion about the first axis.

Example 40

The method of example 39, comprising receiving, at an outer driving coil of the MEMS mirror, a third electric current to induce additional movement of the reflective portion of the MEMS mirror, the outer driving coil disposed at least partially around the sensing coil.

Example 41

The method of example 40, comprising rotating the reflective portion of the MEMS mirror about a second axis in response to the third electric current, the second electric current indicative of at least one of the position of the reflective portion about the first axis or the position of the reflective portion about the second axis.

Example 42

The method of example 41, wherein the MEMS mirror comprises a frame disposed at least partially around the reflective portion and wherein the sensing coil is disposed on the frame.

Example 43

The method of example 42, wherein the MEMS mirror comprises an outer frame disposed at least partially around the frame and wherein the outer driving coil is disposed on the outer frame.

Example 44

The method of example 43, wherein the MEMS mirror comprises torsion bars to mechanically couple the frame to the outer frame.

Example 45

The method of example 44, wherein the MEMS mirror comprises outer torsion bars to mechanically couple the outer frame to a static surface.

Example 46

The method of any one of examples 37 to 45, wherein the outer driving coil comprises between 5 to 120 individual coils, wherein each individual coil is spaced between 2 to 15 microns apart.

Example 47

The method of any one of examples 37 to 45, the driving coil comprises between 5 to 60 individual coils, wherein each individual coil is spaced between 2 to 15 microns apart.

Example 48

The method of any one of examples 37 to 45, wherein the sensing coil comprises between 5 to 15 individual coils, wherein each individual coil is spaced between 2 to 15 microns apart.

Example 49

The method of any one of examples 37 to 45, wherein a perimeter of at least one of the reflective portion or the frame comprises a square, a rectangle, an oval, a circle, or a polygon.

Example 50

An apparatus comprising means to perform the method of any one of examples 24 to 49.

What is claimed is:

1. An apparatus, comprising: a frame; a reflective surface coupled to a portion of the frame, the reflective surface to receive a light beam from a light source; a driving coil coupled to the frame, the driving coil to receive a first electric current to induce movement of at least the portion of the frame about a first axis, the movement to scan the light beam across a projection surface; a sensing coil coupled to the frame, the movement to induce a second electric current in the sensing coil, wherein the second electric current indicates a position of the portion of the frame about the first axis; an outer frame disposed at least partially around the frame; and an outer driving coil coupled to the outer frame, the outer driving coil to receive a third electric current to induce second movement of at least the portion of the frame about a second axis.

2. The apparatus of claim 1, the driving coil disposed proximate to the reflective surface.

3. The apparatus of claim 2, wherein the sensing coil is disposed around the driving coil.

4. The apparatus of claim 1, comprising a substrate, the reflective surface disposed on the substrate and the driving coil embedded into the substrate under the reflective surface.

5. The apparatus of claim 1, comprising torsion bars to mechanically couple the frame to the outer frame, the torsion bars to provide the induced movement about the first axis.

6. The apparatus of claim 1, the second electric current to indicate the position of the reflective surface about the first axis and the second axis.

7. The apparatus of claim 1, wherein a perimeter of at least one of the reflective surface or the frame comprises a square, a rectangle, an oval, a circle, or a polygon.

8. A system comprising:
a light source to emit a light beam; and
a microelectromechanical system (MEMS), the MEMS comprising:
a frame;
a reflective surface coupled to the frame and arranged to receive the light beam;
a driving coil coupled to the frame, the driving coil to receive a first electric current to induce movement of the reflective surface;
a sensing coil coupled to the frame, the movement to induce a second electric current in the sensing coil;
an outer frame disposed at least partially around the frame; and
an outer driving coil coupled to the outer frame, the outer driving coil to receive a third electric current to induce second movement of at least the portion of the frame about a second axis.

9. The system of claim 8, wherein the movement of the portion of the frame about a first axis and the second electric current indicates a position of the portion of the frame about the first axis.

10. The system of claim 9, wherein the movement of the reflective surface to scan the light beam across a projection surface.

11. The system of claim 8, the driving coil disposed proximate to the reflective surface.

12. The system of claim 11, wherein the sensing coil is disposed around the driving coil.

13. The system of claim 8, comprising a substrate, the reflective surface disposed on the substrate and the driving coil embedded into the substrate under the reflective surface.

14. The system of claim 8, comprising torsion bars to mechanically couple the frame to the outer frame, the torsion bars to provide the induced movement about the first axis.

15. The system of claim 8, the second electric current to indicate the position of the reflective surface about the first axis and the second axis.

16. The system of claim 8, wherein a perimeter of at least one of the reflective surface or the frame comprises a square, a rectangle, an oval, a circle, or a polygon.

* * * * *